United States Patent
Canova et al.

(10) Patent No.: US 8,599,477 B2
(45) Date of Patent: Dec. 3, 2013

(54) HOMOGENIZER INCLUDING A PHASE PLATE

(75) Inventors: Federico Canova, Paris (FR); Jean-Paul Chambaret, Chatillon (FR); Stéphane Tisserand, Marseilles (FR); Fabien Reversat, Aix en Provence (FR)

(73) Assignees: Ecole Polytechnique, Palaiseau, Cedex (FR); Silios Technologies, Peynier (FR)

( * ) Notice: Subject to any disclaimer, the term of this patent is extended or adjusted under 35 U.S.C. 154(b) by 627 days.

(21) Appl. No.: 12/682,485

(22) PCT Filed: Oct. 10, 2008

(86) PCT No.: PCT/FR2008/051846
§ 371 (c)(1),
(2), (4) Date: Jun. 10, 2010

(87) PCT Pub. No.: WO2009/053633
PCT Pub. Date: Apr. 30, 2009

(65) Prior Publication Data
US 2011/0038037 A1     Feb. 17, 2011

(30) Foreign Application Priority Data
Oct. 12, 2007  (FR) ..................................... 07 58288

(51) Int. Cl.
*H01S 3/10*   (2006.01)
*H01S 3/094*  (2006.01)

(52) U.S. Cl.
USPC ........................................... 359/343; 372/25

(58) Field of Classification Search
USPC ..................... 359/333, 344; 372/25
See application file for complete search history.

(56) References Cited

U.S. PATENT DOCUMENTS

| 3,677,616 A * | 7/1972 | Lewis ............................. 359/28 |
| 4,521,075 A | 6/1985 | Obenschain et al. |
| 4,619,508 A | 10/1986 | Shibuya et al. |
| 5,328,785 A * | 7/1994 | Smith et al. ........................ 430/5 |
| 5,615,199 A * | 3/1997 | Tatsuno et al. .............. 369/112.2 |
| 5,657,157 A * | 8/1997 | Lang et al. ..................... 359/344 |
| 5,982,806 A * | 11/1999 | Yamaguchi et al. .......... 372/103 |
| 2002/0027716 A1 | 3/2002 | Tanaka |
| 2005/0023478 A1 | 2/2005 | Ruckman et al. |
| 2005/0286599 A1 * | 12/2005 | Rafac et al. ..................... 372/55 |
| 2009/0046757 A1 * | 2/2009 | Miyairi et al. ................. 372/101 |

OTHER PUBLICATIONS

Fabien Plé et al., "Suppression of Parasitic lasing in large-aperture Ti: Sapphire amplifiers. Amplifying strategies for high rep-rate Petawatt class Ti: sapphire systems", Quantum Electronics and Laser Science, 2005 Conference Baltimore, MD, USA May 22-27, 2005, Piscataway, NJ, USA, IEEE, May 22, 2005, pp. 1848-1849.

* cited by examiner

*Primary Examiner* — Eric Bolda
(74) *Attorney, Agent, or Firm* — Greer, Burns & Crain, Ltd.

(57) ABSTRACT

A system for homogenizing a laser pulse emitted by a laser source in order to illuminate a target homogeneously, the system having, between the laser source and the target: a phase plate constituted by a plurality of subpupils capable of generating a plurality of delayed laser beams towards the target, the path difference $\Delta d$ between two adjacent delayed laser beams being greater than or equal to the length of the temporal coherence $T_c$ of the laser pulse, and focusing device; wherein the subpupils and the focusing device are adjusted so that the delayed laser beams are superimposed on the target in a homogeneous spot.

12 Claims, 3 Drawing Sheets

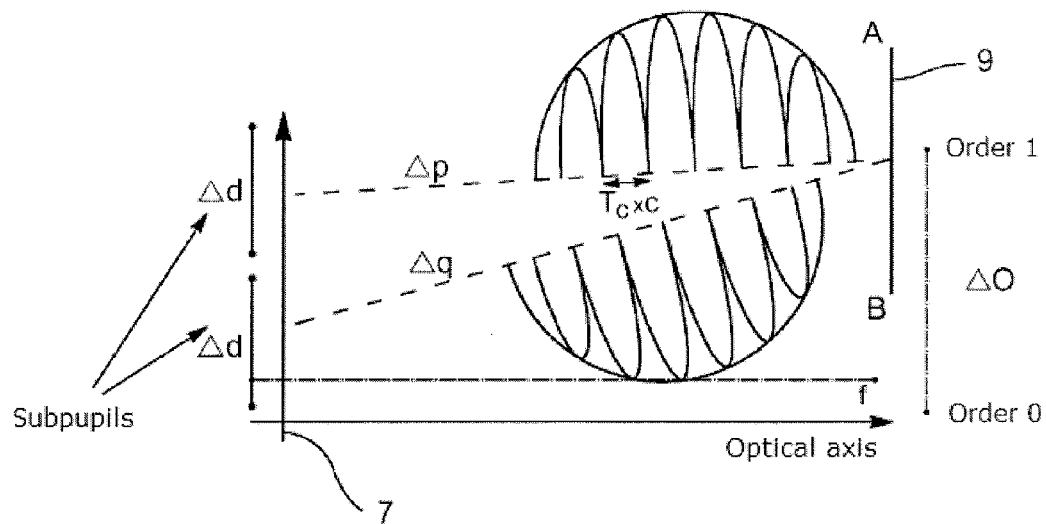
FIG. 3
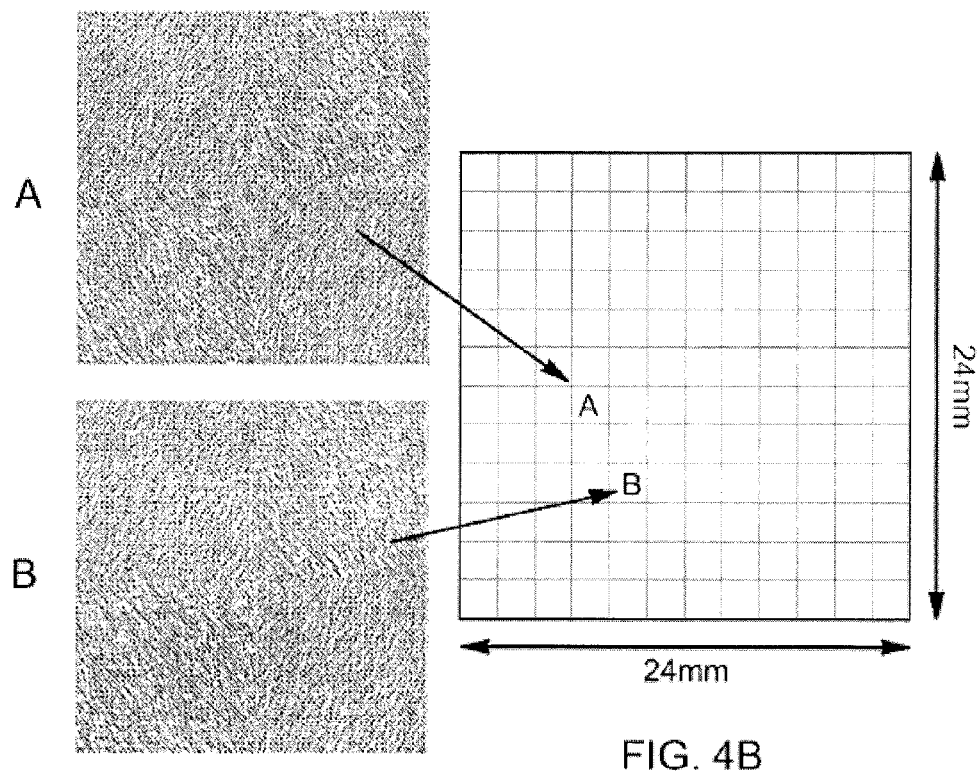
FIG. 4A
FIG. 4B

Subpupil A

Shaping in the focal plane

HOMOGENIZER INCLUDING A PHASE PLATE

BACKGROUND

The present invention relates to a system for homogenizing a laser pulse emitted by a laser source in order to illuminate a target homogeneously.

It finds a particularly useful application in the field of intense laser pumping of femtosecond-amplifier solid media.

In fact, the homogeneity of laser pumping of femtosecond amplifiers that are based in particular on Ti:Sapphire technology is an essential parameter, owing to the difficulty of pumping the amplifiers efficiently (from the standpoint of extraction of energy), and robustly (from the standpoint of damage to the laser material). The damage threshold of Ti:Sapphire, in nanosecond mode, is estimated between 5 and 10 J/cm2. This value does not follow from a systematic study but from an estimate based on experience. The uncertainty concerning the value of the threshold obliges laser engineers to pump the active materials just beyond the saturation fluence, i.e. 1 J/cm2, with a low efficiency of energy extraction (20%), in order to protect the crystals from the risk of damage.

In the case of pumping at 4 J/cm2, for example, the efficiency would be three times higher (60%). In such a case, the damage threshold of the material would be very close to the pumping fluence required for good extraction of energy in power amplifiers, and any inhomogeneity of the pump laser would be translated into a risk of major damage, therefore to a considerable reduction of reliability or consequently to a degradation of performance, both of which mean appreciable extra costs.

This inhomogeneity is due to pump profiles that are never completely under control with the imaging techniques currently in use. These profiles have modulations or hot spots that are often significant and therefore often lead to the destruction of the laser crystals, which moreover are excessively expensive, their price reaching several tens of thousands of Euros for the largest ones, and take a long time to grow, up to 1 year.

If we bear in mind that from 60% to 70% of the price of a laser amplifier is due to the pump lasers, it is clear that this identifies, in the control of the spatial quality of pumping laser beams, a major parameter for the development of systems with better performance.

For limiting the modulations in the pump profiles, we might consider the fact that when the beam is propagated over a few metres, without leaving the Rayleigh zone, the modulations are minimal. For example, if we consider a pump laser supplying 1 J/cm$^2$ (at 532 nm and at 10 Hz) to a Gaussian beam with a diameter of 10 mm, the Rayleigh zone will extend to 140 m. In reality, however, the typical profiles of pump lasers are closer to a "top-hat" (super-Gaussian) profile than a Gaussian profile, as this form is required for optimizing the frequency conversion and the performance of the source in terms of useful energy. In the case of a super-Gaussian profile, with the other characteristics of the example considered above, modulations already appear after just four metres of propagation and can become dangerous for the optics and the laser crystals, even if the Rayleigh zone is much longer. Owing to these modulations it is difficult in practice to use a propagation distance greater than 3-4 metres. With the propagation approaching the Rayleigh zone, there are therefore appreciable constraints on the configuration of the amplifiers, because of the small distances over which beam homogeneity is effectively conserved.

Otherwise, for limiting the modulations in the pump profiles, it is also possible to use the technique consisting of transporting the near field (assumed homogeneous) of the pumping laser beam, by imaging on the amplifying crystal. But this technique does not in any way protect the latter from any possible variation in intensity that might develop over time on the pumping laser used.

It is now known that for effectively limiting these modulations in the pump profiles, it is necessary to homogenize the source, which implies complete control of the transport of energy, from the pump lasers to the active material. With such control, it would be possible to pump the lasers in conditions with high extraction efficiency, but close to the damage threshold and avoid the hot spots that can damage the amplifying crystals. Generally, the purpose of a homogenizer is to ensure homogeneous energy distribution on the amplifying crystal regardless of the initial spatial distributions of the incident beams.

In this connection, a refractive homogenizer with matrices of microlenses is known. Said refractive homogenizer with subpupils is constituted by two parts: a matrix optical element composed of a set of microlenses and a focusing component. Each microlens represents a subpupil. The microlenses separate the incident beam into several segments, and the focusing component superimposes the projection of each subpupil on the focal plane. This technique is based on the low spatial coherence of the laser beam at the entrance to obtain an averaging effect (intensity sum) of the contributions of the various sub-elements distributed over the entire zone to be pumped.

This technique has shown good performance in pumping systems with low spatial coherence. However, for pumping systems with almost perfect spatial coherence, the matrix of microlenses induced modulations of 100%. Even in the case of beams with low spatial coherence, the best homogenization performance is obtained outside of the focal plane, as the latter is modulated by the diffraction effects of the periodical structures, called the Talbot effect. In other words, this Talbot effect prevents the use of the energy distribution in the focal plane and makes it necessary to use planes where the energy distribution is slightly modulated but is not so close to the ideal "top-hat".

Document U.S. Pat. No. 4,521,075 is known; this describes a system for rendering a laser beam, directed towards a target, spatially incoherent. This system comprises, between the laser source and the target:
- an optical component for introducing spatial incoherence between several parts of the laser beam, and
- a focusing lens for directing the laser beam on the target. Overlapping then occurs, which limits the interference at the target.

However, experience has shown that this system is unable to homogenize a source other than a very incoherent laser, for example laser diodes and excimer lasers.

SUMMARY

A purpose of the present invention is to overcome the aforementioned drawbacks by proposing a system for homogenization that eliminates the interference and diffraction effects.

Another purpose of the invention is to propose a system that is able to provide a robust and reliable pumping configuration for amplifiers at high average power in the femtosecond laser systems that are used in an increasing number of installations and are intended to reach peak powers for example beyond the petawatt level.

The present invention also relates to a system that is efficient from the standpoint of energy extraction, making it possible to control the intensity of the laser beam on the target.

At least one of the aforementioned purposes is achieved with a system for homogenizing a laser pulse emitted by a laser source in order to illuminate a target homogeneously, said system comprising, between the laser source and the target:

- a phase plate constituted by a plurality of subpupils that can generate a plurality of delayed laser beams towards the target, the path difference $\Delta d$ between two adjacent delayed laser beams being greater than or equal to the length of temporal coherence $T_c$ of the laser pulse; said length of temporal coherence generally being given by $T_c.C$, where C is the speed of light in the medium in question, and
- focusing means.

According to the invention, the subpupils and the focusing means are adjusted so that said delayed laser beams are superimposed on the target in a homogeneous spot. The phase plate can be constituted by a matrix of optical elements, each applying a delay to each elementary beam passing through it. This optical element, called a subpupil, generates an elementary beam oriented in a given direction. The matrix arrangement and the orientation of the subpupils are determined experimentally or by calculation. The focusing means are positioned so that the elementary beams from the subpupils are superimposed on one another. The elementary beams are covered completely. In contrast, in the system described in document U.S. Pat. No. 4,521,075, the beams overlap but are not superimposed. In fact, with the system according to the present invention, the intensity of the different parts of the beam is summed over the whole zone to be illuminated. A true homogenization is achieved, not simply a spatial incoherence.

According to the invention, the phase plate has N subpupils such that: N is approximately equal to $1/\Gamma^2$, $\Gamma$ being the contrast of the homogeneous spot. In fact N is an integer nearest to the value of $1/\Gamma^2$.

The contrast can be defined as a statistical measure of the homogeneity of the spatial profile of a laser. It is defined as the ratio of the standard deviation to the mean, i.e. $\Gamma=\mathrm{sigma}(I)/<I>$, I being the intensity. The reason for statistical characterization of the homogeneity of a beam arises from the strong spatio-temporal coupling present in the laser pulses, owing to mode coupling due to the partial spatial and temporal coherence. The statistics governing the contrast is described by the mathematical model of speckle patterns. The ergodicity theorem is valid and the statistics describing instantaneous realization is also valid for describing the variation over time.

The present invention makes it possible to relate the intensity of the homogeneous spot, characterized here by its contrast, to the number of subpupils produced by the phase plate. This is in particular beneficial for high-energy laser pumping systems for the CPA-Ti:Sapphire circuits that are based on Nd:YAG and Nd:glass, in configurations with strong spatial coherence. The laser source is decoupled from the target with a kind of optical protection.

With the system according to the invention, a diffractive homogenizer is used, permitting displacement of the contributions of the different subpupils. The beams originating from each subpupil travel a different path. As these path differences are larger than the duration of temporal coherence, the contributions of the subpupils are incoherent, and are therefore added in intensity.

The phase plate has a structure with low periodicity. The plate is not composed of a recurring unit, as each subpupil has a different pattern. Owing to this characteristic, the energy distribution at the focal plane is not modulated by the Talbot effect. We can thus work without defocusing and with a "top hat" of good quality. The phase plate makes it possible to destroy the coherence of the pump beam to obtain pumping that is as incoherent as possible on the laser material.

The optical system for homogenization according to the present invention makes it possible to guarantee repeatability of the spatial profile in intensity on the crystal. This makes it possible to obtain power amplifiers that are more robust. The robustness is linked to control of the energy distribution, which guarantees operation without modulations and without damaging the optical components.

According to the invention, the focusing means can comprise a convergent lens, called a field lens, arranged in such a way that the target is located at the focal distance of this convergent lens. This convergent lens in particular makes it possible to obtain the far field (the Fourier transform) of the product of the profile of the incident beam and the optical transfer function of the phase plate.

According to an advantageous characteristic of the invention, phase information is etched on each subpupil, so that the homogeneous spot has a shape defined by the phase information. This shape comprises both a geometric shape of the homogeneous spot and the "top-hat" shape in intensity of this same homogeneous spot.

Preferably, this phase information is calculated from the inverse Fourier transform of the shape of the spot.

In practice, the phase plate is constituted by a matrix of optical elements each introducing a phase delay, which are different relative to the neighbouring elements. Each optical element constitutes a subpupil projecting an elementary beam towards the target. The subpupils define the energy distribution at the focal plane of the field lens, and the "averaging" of the intensity is proportional to the number of subpupils superimposed.

The present invention therefore makes it possible to define an elementary component (subpupil) responsible for the energy distribution in the desired form. This definition can be made on the basis of the Gerchberg-Saxton algorithm and can be validated by simulation.

According to an advantageous characteristic of the invention, the path difference $\Delta d$ is such that: $\Delta d=T_c.c$, "c" being the speed of light in the medium between the lens and the target.

Advantageously, the transverse dimension of the phase plate is greater than the diameter of the laser beam constituting the laser pulse. Moreover, the ratio of the transverse dimension of each subpupil to the diameter of the laser beam is proportional to the contrast $\Gamma$; this makes it possible to fix the geometry of the phase plate. In fact, it is assumed that the amplitude of the laser beam at the entrance of the phase plate is uniform on each subpupil. Based on this assumption, the profile on the focal plane is the superposition of the diffraction spots of each subpupil. If the laser beam is not actually uniform on each subpupil, the difference from uniformity will be averaged by superimposing the various diffraction spots. It is then envisaged that the ratio of the size of the beam to the size of each subpupil is sufficiently large (>10) for these differences in homogeneity in the beam profile to be averaged at the focal plane.

For a given beam size, the performance of a homogenizer according to the invention depends on a compromise between the size of the subpupils, which defines the effects due to diffraction and to coherence, and the number of subpupils.

According to the invention, the lens can be integral with the phase plate. This approach is called a Fresnel lens.

Preferably, the laser source is a pump laser and the target is an amplifying solid medium. The target can advantageously be a titanium-doped sapphire crystal. The laser source can advantageously be a frequency-doubled laser selected from the following lasers: Nd:YAG; Nd:glass, Nd:YLF, Yb:glass, Yb:YAG.

According to another aspect of the invention, an application of the system for pumping amplifying media in a CPA-Ti:Sapphire laser circuit is proposed.

BRIEF DESCRIPTION OF THE DRAWINGS

Other advantages and characteristics of the invention will become apparent on examination of the detailed description of an embodiment which is in no way limitative, and the attached diagrams, in which:

FIG. 3 is a diagrammatic view illustrating the displacement due to the path difference for elementary beams from two adjacent subpupils;

FIG. 4a is a diagrammatic view of a phase plate according to the invention with two subpupils shown in detail;

FIG. 4b is a diagrammatic view of a mosaic of subpupils constituting a phase plate.

DETAILED DESCRIPTION

Although the invention is not limited to this, the homogenization of a laser pump beam for a Ti:Sapphire power amplifier will now be described. The Ti:Sapphire amplifying material has its absorption maximum at about 500 nm. Almost all pumping systems for power amplifiers are based on the neodymium ion, whether in a YAG or YLF crystal lattice, or in a vitreous lattice. The choice of this material and its use in decoupled mode are dictated by economic and technological considerations. These neodymium systems are excited by flash lamp at a repetition rate of several Hz and emit at 1 µm, and are then frequency-doubled to reach the absorption wavelengths of Ti:Sapphire.

Figure 1:
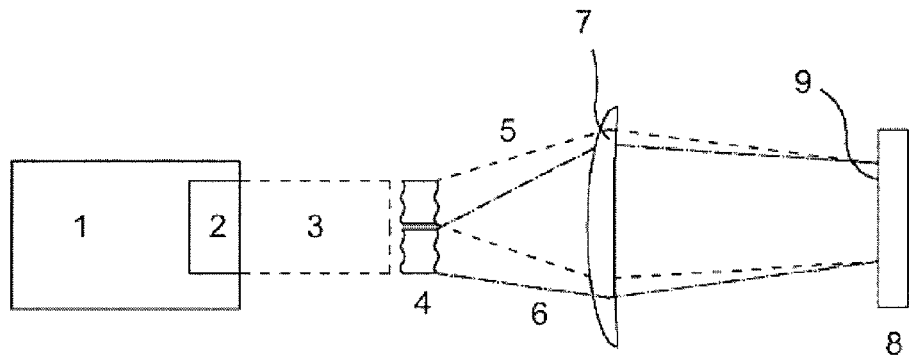
FIG. 1 is a diagrammatic view of the system for homogenization according to the present invention.

FIG. 1 shows an Nd:YAG pump laser 1 having, at its exit, a doubling crystal 2 after amplification. This pump laser 1 emits a laser pulse 3 at about 500 nm towards a phase plate 4. The latter is represented schematically, showing the steps. This phase plate 4 is a diffractive optical component constituted by a matrix of N optical elements which redirect the beam onto the target along a path of different length for each ray. Each optical element constitutes a subpupil. The steps make it possible to represent the difference in optical path between two elementary beams 5 and 6 from two different subpupils. A Fourier lens or field lens 7 allows all of the elementary beams 5, 6 to be converged on a face of the amplifier 8. These N elementary beams 5, 6 are superimposed on this surface, creating a homogeneous spot 9.

Experiments have shown very good results for a laser pulse whose coherence length is much less than the pulse duration and is of the order of a few picoseconds.

Figure 2:
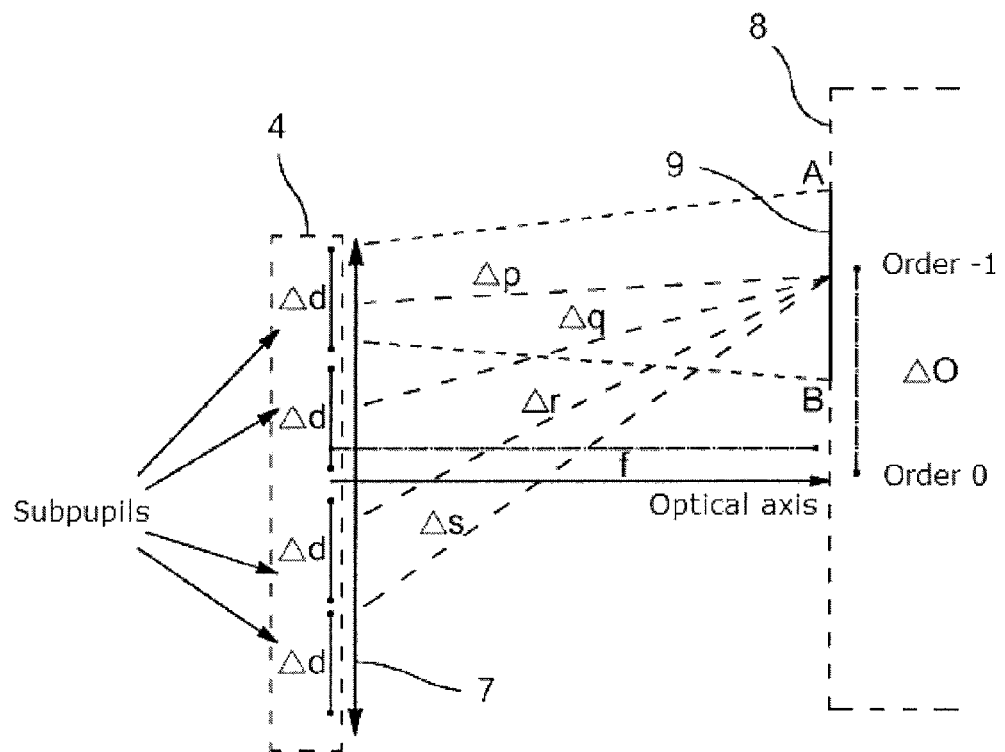
FIG. 2 is a diagrammatic view of the effect of a phase plate according to the invention on the energy distribution of a laser beam.

The effect of the phase plate according to the invention on the redistribution of energy of a laser pulse can be simplified as shown in FIG. 2. This diagram shows the principle of beam deflection with phase plate 4 and Fourier lens 7 of focal length f. The phase plate 4 creates an off-axis image with a homogeneous, "super-Gaussian" profile. The possibility of summing the contributions of N subpupils in intensity but not in amplitude arises from the different optical path of the N elementary beams. In the diagram in FIG. 2, a condition can be imposed, derived from knowledge of the temporal coherence of the laser beam, on the path difference between the rays of two adjacent subpupils. If the temporal coherence of a laser pulse is defined by Tc, the path difference between subpupils Δd necessary to obtain incoherent superposition of the parts of the beam is:

$$\Delta d = \Delta q - \Delta p \geq T_c c$$

where c is the speed of light, and Δq and Δp are the optical paths of the rays originating from two adjacent subpupils. In practice, $T_c$ is calculated from the curve of the laser pulse, and Δd is deduced from that.

The points A and B represent the margins of the homogeneous spot 9 on which the energy is redistributed at the focal plane. The phase plate 4 and the lens 7 function as a network which displaces the homogeneous spot 9 from the optical axis, of order −1. This displacement is represented by the quantity ΔO. The diameters of the subpupils are represented by Δd. Δp, Δq, Δr and Δs represent the optical paths of the rays from the different subpupils. The homogeneous spot is at a distance f, which corresponds to the focal length of the Fourier lens 7.

FIG. 3 shows once again a part of the diagram in FIG. 2. Only two elementary beams are discernible, delayed by Δq and Δp respectively. FIG. 3 shows the relationship between the displacement due to the different paths of the rays originating from two adjacent subpupils and the temporal coherence of the beam. The incident beam can be represented schematically in the form of an envelope, under which there are different longitudinal modes, all with a duration of temporal coherence $T_c$.

The system according to the invention can also be characterized by defining the intensity level of the homogeneous spot, i.e. the concentration resulting from the elementary beams on the face of the amplifier. The invention is in particular remarkable in that, for a desired concentration Γ on the homogeneous spot 9, a number N of subpupils is determined, all of which are summed in intensity on the focal plane, incoherently and owing to the time shift, in such a way that:

$$N = 1/\Gamma^2.$$

The system according to the invention can be further characterized by defining the form of the homogeneous spot 9, i.e. its geometric shape (circle, square, star, etc.) and its intensity profile ("top hat").

The shaping for obtaining "top-hat" profiles in far field consists of etching phase information on the phase plate, which is of fused silica. The various sub-elements (subpupils) are assembled as a mosaic. The principle of the diffractive homogenizer is propagation of the elementary beams in a direction induced by a diffractive system, of the diffraction grating or Fresnel lens type. The field lens (optionally integral with the plate) makes it possible to superimpose the various elementary beams in the Fourier plane.

FIG. 4a shows two examples of shaping subpupils 10 and 11. FIG. 4b shows the matrix structure 12 of the phase plate used for homogenization. Starting from a plate composed of two sub-elements 10 and 11, calculated with different initial conditions, a matrix of 576 elements (24×24) can be formed. The plate positions the homogeneous plane off-axis.

Figure 5A:
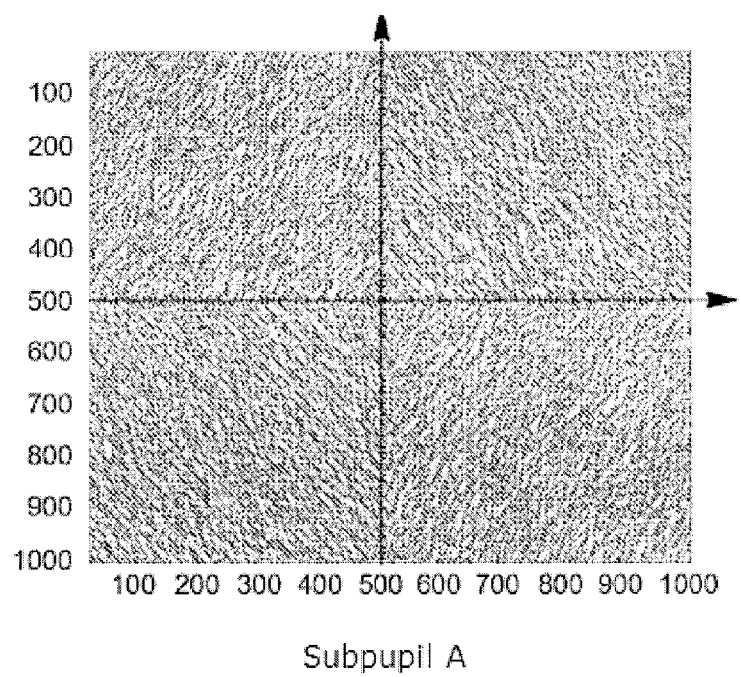
FIG. 5a is a more detailed view of a subpupil and FIG. 5b is a view of the homogeneous spot on the target.
Figure 5B:
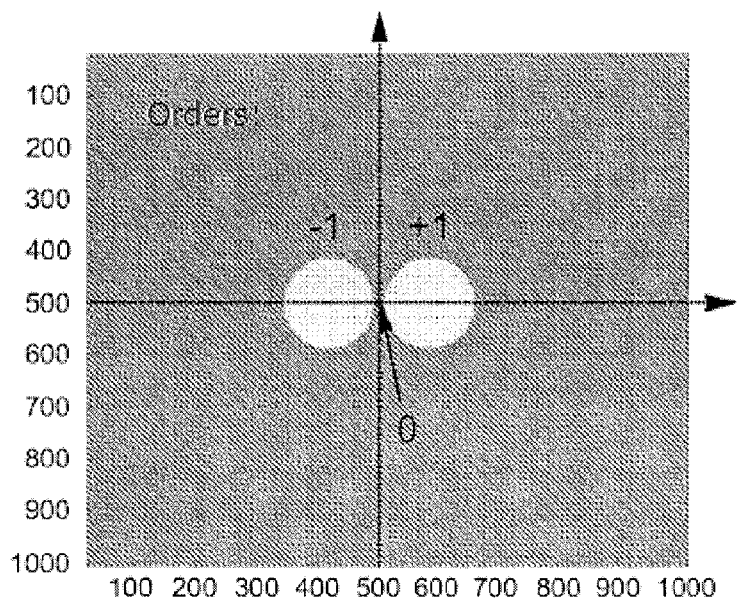

FIG. 5a shows subpupil 10 in a bit more detail. The form obtained in the Fourier plane owing to the profile etched in the subpupil designated A is shown in FIG. 5b. The shaping in the focal plane of the lens was calculated as the numerical Fourier transform of the etched profile. In the shaping in FIG. 5b, there are two "top-hat" profiles around the order 0, which correspond to the order −1 and to the order +1. In the final component 12, structured as a matrix, a grating is etched to optimize the redirection of the energy in just one of the two orders.

The problem of phase reconstruction based on measurements of intensity has given rise to several calculation techniques and algorithms. Among the various techniques developed in the course of the last twenty years, the techniques most widely used are that of Gerchberg-Saxon, for systems where the paraxial approximation is valid, and that of Yang-Gu, which generalizes the solution of the aforementioned method for any optical system. An equivalent approach is that of Dixit, which was used for optimizing the phase plates of the systems of the NIF (National Ignition Facility).

The information directly measurable experimentally in an optical system is the intensity profile. To reconstruct a defined spatial profile and to be able to predict the behaviour during propagation, it is also necessary to obtain information about the spatial phase. This information can be recovered using specific instruments or with iterative algorithms which use the intensity information for two spatial profiles connected by a Fourier transform relation. The consequence of development of these calculation algorithms is that a tool is provided for defining the phase required to obtain a conjugated plane where the contributions of the different sub-elements are superimposed. This technique is used for calculating the sub-elements of the homogenizer, and the Fourier lens for obtaining the far field.

From the practical standpoint, the procedure consists of defining a shaping for the beam in the focal plane as initial profile and recording the experimental profile of the pump laser source as the second source of data. A series of equations makes it possible to calculate the phase profile to be etched on the mask to obtain the desired result.

As an example, phase calculation using the Gerchberg-Saxon algorithm will now be described.

P1 represents a part of the spatial profile of the pump laser, with its typical fluctuations, and P2 represents the desired distribution in the focal plane. The two wave functions in planes P1 and P2 are represented by U1 and U2, defined as:

$$U_1(\overline{X}_1) = \rho1(\overline{X}_1)\exp[i\phi_1(\overline{X}_1)]$$

$$U_2(\overline{X}_2) = \rho2(\overline{X}_2)\exp[i\phi_2(\overline{X}_2)]$$

The z axis is selected parallel to the axis of propagation of the laser and the points of transverse coordinates are described by the matrices $\overline{X}_1 = (x_1, y_1)$ and $\overline{X}_2 = (x_2, y_2)$. The relation between the two planes is given by a relation of linear transformation $G(\overline{X}_2, \overline{X}_1)$ of the type $$U_2(\overline{X}_2) = \int G(\overline{X}_2, \overline{X}_1) U_1(\overline{X}_1) d\overline{X}_1 = \hat{G} U_1(\overline{X}_1)$$

In optical systems where the paraxial approximation is valid, $\hat{G}$ is a unit operator (within the scope of the algorithm of Yang-Gu, valid outside of the hypothesis of the paraxial approximation, $\hat{G}$ is a Hermite operator). The efficiency with which the profile obtained with the transform of the initial plane $GU_1(\hat{X}_1)$ approaches the desired profile $GU_2(\hat{X}_2)$ is evaluated by defining a standard D equal to a "quadratic distance", for example:

$$D(\rho_1, \phi_1, \rho_2, \phi_2) = \|U_2 - \hat{G}U_1\| = [\int dx_2 |U_2(x_2) - \hat{G}U_1|]^{1/2}$$

Without loss of generality in the solution of the problem, this standard can be required to be equal to 0. If D=0, this requires that $U_2 = \hat{G} U_1$, i.e. that the desired profile and the profile obtained must be exactly equal. Mathematically, this condition translates into a problem of finding the extrema of function D as a function of the variables $\rho_1, \phi_1, \rho_2, \phi_2$.

We can define this problem with discrete variables, so that it can be solved numerically using algorithms. The condition to be observed is that the sampling of the variables, of the operator $\hat{G}$ and of the planes P1 and P2 should respect the Nyquist-Shannon theorem. If this condition is observed, the phase information can be recovered.

The equations used in the reconstruction algorithm, written in matrix form, are:

$$\phi_2(x_2) = \arg\lfloor \hat{G} \rho_1 \exp(i\phi_1) \rfloor$$

$$\phi_1(x_1) = \arg\lfloor \hat{A}_D^{-1} \lfloor \hat{G} \rho_2 \exp(i\phi_2) - \hat{A}_{ND} \rho_1 \exp(i\phi_1) \rfloor \rfloor$$

with $\hat{A}_D = \hat{1}$ and $\hat{A}_{ND} = 0$ if $\hat{G}$ is a unit operator (condition of the Gerchberg-Saxon algorithm). The solutions are sought using an iterative method based on arbitrary starting hypotheses relating to the iteration start phases in the initial plane $\phi_1^{(0,0)}$ and final plane $\phi_2^{(0,0)}$.

Exit from the iteration loop occurs when two successive steps (m and m+1) change the phase by less than an amount $\epsilon_1$, defined arbitrarily. The mathematical condition for exit from the iterations is:

$$\int dx_1 |\phi_1^{(0,m_1)} - \phi_1^{(0,m_1+1)}| \leq \epsilon_1$$

where $\phi_1^{(0,m_1)}$ represents the initial phase.

This algorithm makes it possible to define a phase profile to be etched on the plate to obtain the desired profile on the focal plane.

Of course, the invention is not limited to the examples which have just been described and numerous adjustments can be made to these examples without exceeding the scope of the invention.

The invention claimed is:

1. A system for homogenizing a laser pulse emitted by a laser source in order to illuminate a target homogeneously, said system comprising, between the laser source and the target:
    a phase plate constituted by a plurality of subpupils capable of generating a plurality of delayed laser beams towards the target, the path difference Δd between two adjacent delayed laser beams being greater than or equal to the length of the temporal coherence $T_c.C$ of the laser pulse, wherein C is the speed of light in a medium in question;
    a focusing component; and
    the subpupils and the focusing component being adjusted so that said delayed laser beams are superimposed on the target in a homogeneous spot, wherein phase information is etched on each subpupil so that the homogeneous spot has a shape defined by the phase information.

2. The system according to claim 1, characterized in that the phase plate has N subpupils such that: N is approximately equal to $1/\Gamma^2$, $\Gamma$ being the contrast of the homogeneous spot.

3. The system according to claim 1, characterized in that the target is disposed on a Fourier plane of the focusing component, the phase information being calculated from the inverse Fourier transform of the shape of the spot.

4. The system according to claim 1, characterized in that the focusing component comprises a convergent lens arranged in such a way that the target is located at the focal distance of said convergent lens.

5. The system according to claim 1, characterized in that the path difference $\Gamma d$ is such that: $\Gamma d = T_c.C$, "C" being the speed of light.

6. The system according to claim 1, characterized in that a transverse dimension of the phase plate is greater than a diameter of the laser beam constituting the laser pulse.

7. The system according to claim 1, characterized in that the ratio of a transverse dimension of each subpupil to a diameter of the laser beam constituting the laser pulse is proportional to a contrast of the homogeneous spot $\Gamma$.

8. The system according to claim 1, characterized in that the lens is integral with the phase plate.

9. The system according to claim 1, characterized in that the laser source is a pump laser and the target is an amplifying solid medium.

10. The system according to claim 9, characterized in that the target is a titanium-doped sapphire crystal.

11. The system according to claim 9, characterized in that the laser source is a frequency-doubled laser selected from the following lasers: Nd:YAG; Nd:glass, Nd:YLF, Yb:glass, Yb:YAG.

12. Application of the system according to claim 1, for the pumping of amplifying media in a CPA-Ti:Sapphire laser circuit.

* * * * *